US009604406B2

(12) United States Patent
Mahdavi et al.

(10) Patent No.: US 9,604,406 B2
(45) Date of Patent: Mar. 28, 2017

(54) THREE-DIMENSIONAL DESIGN AND MANUFACTURING SYSTEMS

(75) Inventors: Siavash Haroun Mahdavi, London (GB); Anthony Ruto, London (GB); Hooman Shayani, London (GB)

(73) Assignee: Grow Software Limited, London (GB)

( * ) Notice: Subject to any disclaimer, the term of this patent is extended or adjusted under 35 U.S.C. 154(b) by 509 days.

(21) Appl. No.: 14/114,495

(22) PCT Filed: Apr. 27, 2012

(86) PCT No.: PCT/GB2012/050950
§ 371 (c)(1),
(2), (4) Date: Feb. 19, 2014

(87) PCT Pub. No.: WO2012/146943
PCT Pub. Date: Nov. 1, 2012

(65) Prior Publication Data
US 2014/0156053 A1    Jun. 5, 2014

Related U.S. Application Data

(60) Provisional application No. 61/479,762, filed on Apr. 27, 2011.

(51) Int. Cl.
*H04L 29/06* (2006.01)
*B29C 67/00* (2017.01)
(Continued)

(52) U.S. Cl.
CPC ...... *B29C 67/0051* (2013.01); *B29C 67/0059* (2013.01); *G06Q 50/04* (2013.01);
(Continued)

(58) Field of Classification Search
CPC  B29C 67/0051; B29C 67/0059; G06Q 50/04; H04L 9/3271; H04L 2209/56;
(Continued)

(56) References Cited

U.S. PATENT DOCUMENTS 6,385,728 B1    5/2002 DeBry
8,245,306 B2 *  8/2012 Gimenez ................. G06F 21/10
380/51
(Continued)

FOREIGN PATENT DOCUMENTS

WO    WO 01/77988 A2    10/2001

OTHER PUBLICATIONS

PCT International Search Report, PCT/GB2012/050950, Nov. 28, 2012, 3 Pages.

*Primary Examiner* — Sarah Su
(74) *Attorney, Agent, or Firm* — Fenwick & West LLP

(57) ABSTRACT

Embodiments relate to printing a three-dimensional (3D) article from a 3D design file describing a 3D design. A computer processor receives the design file in an encrypted format. The design file includes a design file identifier and a 3D printer identifier identifying a 3D printer capable of printing a 3D article in accordance with the design file. The processor constructs an authentication request for authenticating use of the design file with the printer and transmits the authentication request to an authentication server. The processor receives a response from the authentication server enabling printing of the article from the design file on the printer. The processor uses a decryption key included in the response to decrypt the design file including 2D contour data. The processor sends the decrypted design file to the printer associated with the printer identifier. The printer prints the article in accordance with the decrypted contour data.

15 Claims, 7 Drawing Sheets

(51) Int. Cl.
*G06Q 50/04* (2012.01)
*H04L 9/32* (2006.01)

(52) U.S. Cl.
CPC ........ *H04L 9/3271* (2013.01); *H04L 2209/56* (2013.01); *H04L 2209/60* (2013.01); *Y02P 90/265* (2015.11); *Y02P 90/30* (2015.11)

(58) Field of Classification Search
CPC ......... H04L 2209/60; G11B 20/007535; G06F 21/62; Y02P 90/30; Y02P 90/265
USPC ................ 726/4, 26, 27, 29, 31; 705/51, 52
See application file for complete search history.

(56) References Cited

U.S. PATENT DOCUMENTS

| | | | | |
|---|---|---|---|---|
| RE44,209 E | * | 5/2013 | Goodman | G06F 21/84 380/201 |
| 2002/0140972 A1 | * | 10/2002 | Onishi | G06F 21/608 358/1.15 |
| 2003/0081247 A1 | * | 5/2003 | Sharma | G06F 21/608 358/1.15 |
| 2003/0099353 A1 | * | 5/2003 | Goh | G06Q 20/389 380/51 |
| 2004/0125402 A1 | | 7/2004 | Kanai et al. | |
| 2005/0268089 A1 | | 12/2005 | Kim et al. | |
| 2005/0273852 A1 | | 12/2005 | Ferlitsch | |
| 2006/0054039 A1 | * | 3/2006 | Kritchman | B29C 41/02 101/424.1 |
| 2007/0229883 A1 | * | 10/2007 | Fujimori | G06F 3/1208 358/1.15 |
| 2011/0037992 A1 | * | 2/2011 | Kato | G03G 15/50 358/1.13 |
| 2012/0092724 A1 | | 4/2012 | Pettis | |
| 2012/0105903 A1 | * | 5/2012 | Pettis | G06F 3/12 358/1.14 |
| 2014/0117585 A1 | * | 5/2014 | Douglas | B29C 67/0055 264/401 |

* cited by examiner

THREE-DIMENSIONAL DESIGN AND MANUFACTURING SYSTEMS

FIELD OF THE INVENTION

The present invention concerns improvements for 3D design and manufacturing systems. Specifically, the present invention relates to a method of controlling the printing of an article from a 3D design file.

BACKGROUND OF THE INVENTION

Additive Layer Manufacturing (ALM), also commonly referred to as 3D printing, is a process of making three-dimensional objects from a digital file. Currently, additive manufacturing is mostly used for rapid prototyping by large in-house corporate design departments to manufacture 3D prototypes of new designs, during the early stages of a product development cycle.

Due to the relatively high operating costs and the expertise required to operate 3D printers, 3D printing has not yet become accessible to the consumer user market. Currently 3D design files are created using Computer Assisted Design (CAD) software, such as SolidWorks™, to generate a digital representation of a 3D object. The STL (Standard Tessellation Language) file format is a commonly used format for storing such CAD files. This CAD file, in other words the digital representation of the 3D object, is subsequently converted into a series of contiguous 2D cross sections, representing sequential cross-sectional slices of the 3D object. These 2D cross sections are commonly referred to as 2D contour data. The 2D contour data can be directly input into a 3D printer in order for the printer to print the 3D object. Conversion of a 3D design file into 2D cross-sectional data is often carried out by dedicated software.

Laser sintering is a commonly used additive manufacturing technique for the manufacture of high quality parts. During the printing process, a laser is used to fuse particles of material together. Selective Laser Sintering (SLS) is an example of a type of laser sintering. Before a printing cycle is executed, the laser parameters must be appropriately configured on the basis of the object being printed. For example, different materials will require different laser parameter settings in order to achieve the required solidity/rigidity. Such parameter settings may include, but are not restricted to, one or more of the following: laser power; laser speed; laser focal spot size; laser offsetting; layer thickness; contouring strategies; and section filling strategies. Similarly, different parameter settings may also be associated with different build algorithms used to print features such as hatching and/or to print specific geometric structures such as meshes. The expertise of a skilled 3D printer machine operator familiar with the performance and capabilities of the printer, is required to correctly configure the 3D printer with the most appropriate parameter settings, to ensure that printed objects satisfy the required specifications. This required level of expertise in order to correctly configure a 3D printer is a reason why 3D printers are inaccessible to the lay consumer user.

A significant amount of time and effort has been invested in this field of technology to make 3D printing accessible to the consumer user market, with little success to date. Nonetheless, 3D printing technology has been earmarked as a potential means for manufacturing user generated designs, wherein commercial products are manufactured in accordance with user generated designs. Currently, a trade off is made between quality of printing and price in commercially available 3D printers, for private home use. In order to keep the printers affordable for the home user, print quality is sacrificed. As a result, most currently available consumer 3D printers are unable to provide high quality prints, required for the printing of functional products. On the basis of these observations and the expertise required to configure and operate 3D printers, it becomes clear that alternative logistical solutions are required to extent the benefits and advantages of 3D printing to the private user.

One possible logistical solution is use of distributed computer network systems. In such systems, the printing of 3D objects in accordance with user generated designs is outsourced to dedicated 3D printing farms, also commonly referred to as print bureaus.

In such distributed computer network systems, product design and product manufacture are distinct, separate events, which occur remotely to each other, and are carried out by different entities. For example, whilst the private user may be responsible for designing the 3D object, manufacturing the object is outsourced to a 3D print farm. There are several problems with such a system, which must be addressed in order for it to provide a commercially viable alternative to existing manufacturing solutions. For example, such a system is prone to piracy. Specifically, there is no mechanism to prevent the unauthorised use of copyright works and/or the unauthorised use of proprietary design works, once these have been provided to the manufacturer. In other words, there is no mechanism for designers to control how their designs are used, once the manufacture of an object has been commissioned, and the manufacturer provided with the proprietary designs. For example, this problem is currently widely present in, but not limited to, the fashion industry, where the manufacturing of high-end couture is outsourced to third party manufacturers. For example, a designer may commission a fixed number of clothing articles to be manufactured to a proprietary design. However, ultimately, the designer has no control over the total number of articles actually manufactured by the manufacturer. Often, the manufacturer may manufacture a greater number of articles than were commissioned. The commissioned articles are delivered to the designer, whilst the additionally manufactured non-commissioned articles are distributed on the grey market. The designer and rights holder obtains no compensation from the sale of the non-commissioned articles. This problem is present in every system where manufacture and design are carried out by different autonomous entities.

It is an object of the present invention to solve at least some of the above identified shortcomings currently present in 3D printing distributed networks, in order to provide a commercially viable system that is accessible to the layman user, for the manufacturing of products in accordance with user generated designs.

SUMMARY OF THE INVENTION

A first aspect of the invention relates to a method for printing a three-dimensional (3D) article from a 3D design file describing a 3D design. The method comprises the steps of: receiving the 3D design file in encrypted format, the 3D design file comprising a unique design file identifier and a unique 3D printer identifier identifying a 3D printer capable of printing a 3D article in accordance with the 3D design file; constructing an authentication request for authenticating use of the design file with the 3D printer specified by the 3D printer identifier, the request including the unique design file identifier and the unique 3D printer identifier; transmitting the authentication request to an authentication server;

receiving an authentication response from the authentication server, the response enabling printing of the article from the 3D design file on the specified 3D printer, the response comprising a decryption key arranged to decrypt the encrypted 3D design file; using the decryption key to decrypt the received encrypted 3D design file, and sending the decrypted 3D design file to the 3D printer associated with the unique 3D printer identifier; and printing the article in accordance with the decrypted 3D design file at the 3D printer. In this way, access to the contents of a 3D design file may be controlled and in particular only an authorised 3D printer is able to print an object in accordance with the 3D design file.

The decryption step may additionally comprise decrypting a 2D contour data file included in the 3D design file, and the method further comprises printing the article in accordance with the decrypted 2D contour data file at the 3D printer. This is advantageous since the 2D contour data may be used directly by the 3D printer to manufacture the article, without first having to generate the 2D contour data during the build process.

Alternatively, the decryption step may comprise decrypting a 3D printer configuration file included in the 3D design file, and the method further comprises configuring the 3D printer in accordance with the configuration file, and the printing step comprises printing the article in accordance with the configuration specified by the configuration file. This minimises the amount of processing required of the 3D printer in order to being the manufacturing process, and also means that the 3D design file provides all the information required by the 3D printer to manufacture the associated article.

In certain embodiments, the configuration file may specify the material to be used by the 3D printer for printing of the article, and the configuring step comprises specifying the material to be used by the printer. Similarly, where the 3D printer comprises a laser, the configuring step may comprise specifying the optical power output of the laser, and/or the focal spot size of the laser.

The decryption key may be one-time user decryption key arranged to expire after a single use. In such embodiments, the method further comprises: transferring a second authentication request to the authentication server, and receiving a second authentication response from the authentication server, the response comprising a second one-time use decryption key arranged to decrypt the encrypted 3D design file. This ensures that for every article to be printed, a new decryption key must be requested from the authentication server. In turn, this advantageously means that the authentication server can maintain an up to date log of the number of articles printed in accordance with a specific design on the basis of the number of received authentication requests. In this way, the authentication server is able to limit and control the number of articles printed in accordance with the 3D design, and the repeated manufacture of an article beyond an assigned limit can be prevented.

In certain embodiments the received authentication response only enables a single article to be printed from the 3D design file. In this way, each time an article needs to be printed, an authentication request must be forwarded to the authentication server.

Alternatively, the authentication response only enables a predetermined plurality of articles to be printed from the 3D design file, and the method further comprises: maintaining a count of the number of copies of the article that are printed; determining when the predetermined plurality of copies have been printed; and preventing further copies of the article being printed from the 3D print file until a further authentication response is received from the authentication server. For example, in some embodiments the 3D printer's control software monitors the number of articles printed and compares this with the authorised number of articles, which may be comprised in the received 3D design file. Once the predetermined number of authorised articles have been printed, the authentication serve is notified. In this way, the authentication server is able to monitor the number of articles that have been printed in accordance with the 3D design file.

A second aspect of the invention relates to a printing system for printing a three-dimensional (3D) article from a 3D design file describing a 3D design. The system comprising: a receiver for receiving the 3D design file in encrypted format, the 3D design file comprising a unique design file identifier and a unique 3D printer identifier identifying a 3D printer capable of printing a 3D article in accordance with the 3D design file; a constructing module for constructing an authentication request for authenticating use of the design file with the 3D printer specified by the 3d printer identifier, the request including the unique design file identifier and the unique 3D printer identifier; a transmitted for transmitting the authentication request to an authentication server; the receiver being arranged to receive an authentication response from the authentication server, the response enabling printing of the article from the 3D design file on the specified 3D printer, the response comprising a decryption key arranged to decrypt the encrypted 3D design file; a decryption module arranged to use the decryption key to decrypt the received encrypted 3D design file, and sending the decrypted 3D design file to the 3D printer associated with the unique 3D printer identifier; and a 3D printer arranged to print the article in accordance with the decrypted 3D design file.

Preferably, the system comprises a plurality of 3D printers, each printer having a different set of capabilities for printing out the 3D article from the 3D design file. For example, the system may comprise a 3D print farm and/or a 3D bureau. In this way, the system is able to cater for a variety of different printing requirements, since different printers will have different performance characteristics. For example, different printers may be used to print with different materials.

Preferably, the receiver, constructing module, transmitter and decryption module are provided as part of a 3D print server which is connectable to the authentication server and to the 3D printer or printers via a communications network.

Preferably, the system is arranged to notify the authentication server when a predetermined number of prints of an article have been made from a single authenticated 3D design file. This helps the authentication server to ensure that only an authorised number of articles are printed in accordance with the 3D design.

A third aspect of the invention relates to a method of authenticating the printing of a 3D article at a 3D printer according to a 3D print file describing a 3D design. The method comprises: receiving an authentication request from a 3D print server that is associated with the 3D printer, the request comprising a unique design identifier associated with a 3D design file and a unique 3D printer identifier associated with a 3D printer, the received unique 3D design identifier being related to the received 3D printer identifier in accordance with a first relationship; using at least one of the received unique identifiers to access a verifying 3D design identifier and a verifying 3D printer identifier, the verifying identifiers being related to each other in accordance with a second relationship; comparing the first and second relationships between the received and verifying identifiers; generating an authentication signal if the first relationship corresponds with the second relationship; obtaining a decryption key associated with the received identifiers in response to the authentication signal; and transferring the decryption key to the 3D print server to authenticate and enable the printing of the 3D article on the 3D printer.

Preferably, the method further comprises: providing a record indicating the number of articles that may be printed in accordance with the 3D design file; updating the record to indicate the number of remaining articles that may be printed in accordance with the 3D design file after the authentication response has been transferred from the authentication server.

Additionally, the method may further comprise determining when the number of articles which may be printed is zero and thereafter preventing the authentication of further requests for printing of articles from that 3D design file.

Preferably, the verifying identifiers are stored in a database and the using step comprises querying the database to retrieve the second relationship.

Preferably, the method further comprises logging the details of each request for authentication processed to create a transaction log of all requests; and subsequently using the transaction log to determine usage by a user of the 3D printer. Accordingly, the transaction log may be used to determine the number of articles printed by each 3D printer.

A fourth aspect of the present invention relates to an authentication server for authenticating the printing of a three-dimensional (3D) article at a 3D printer according to a 3D print file describing a three-dimensional design. The authentication server comprising: a receiver for receiving an authentication request from a 3D print server that is associated with the 3D printer, the request comprising a unique design identifier associated with a 3D design file and a unique 3D printer identifier associated with a 3D printer, the received unique 3D design identifier being related to the received 3D printer identifier in accordance with a first relationship; a verifying module for using at least one of the received unique identifiers to access a verifying 3D design identifier and a verifying 3D printer identifier, the verifying identifiers being related to each other in accordance with a second relationship; the verifying module being arranged to compare the first and second relationships between the received and verifying identifiers and to generate an authentication signal if the first relationship corresponds with the second relationship; a decryption module arranged to obtain a decryption key associated with the received identifiers in response to the authentication signal; and a transmitter arranged to transmit the decryption key to the 3D print server to authenticate and enable the printing of the 3D article on the 3D printer.

An advantage associated with this authentication server is that it enables access and use of a 3D design file to be controlled. Accordingly, unauthorised reproduction and/or printing of a 3D article in accordance with the 3D design can be prevented. The authentication server benefits from the same advantages as described in relation to the previously described aspects of the invention.

A fifth aspect of the present invention relates to a controlled system for printing a three-dimensional article according to a 3D design file describing a three-dimensional (3D) design, the system comprising a system according to any of the previously described systems and an authentication server as descried in the preceding paragraph.

DETAILED DESCRIPTION OF EMBODIMENTS OF THE INVENTION

To help the reader better understand the present invention, an example of a prior art distributed computer network system currently used for manufacturing of 3D objects in accordance with a user generated design, using ALM techniques, is presented for illustrative purposes only. This is followed by a detailed description of preferred embodiments of the present invention. In this way, it is hoped that the reader will better understood the present invention.

Figure 1:
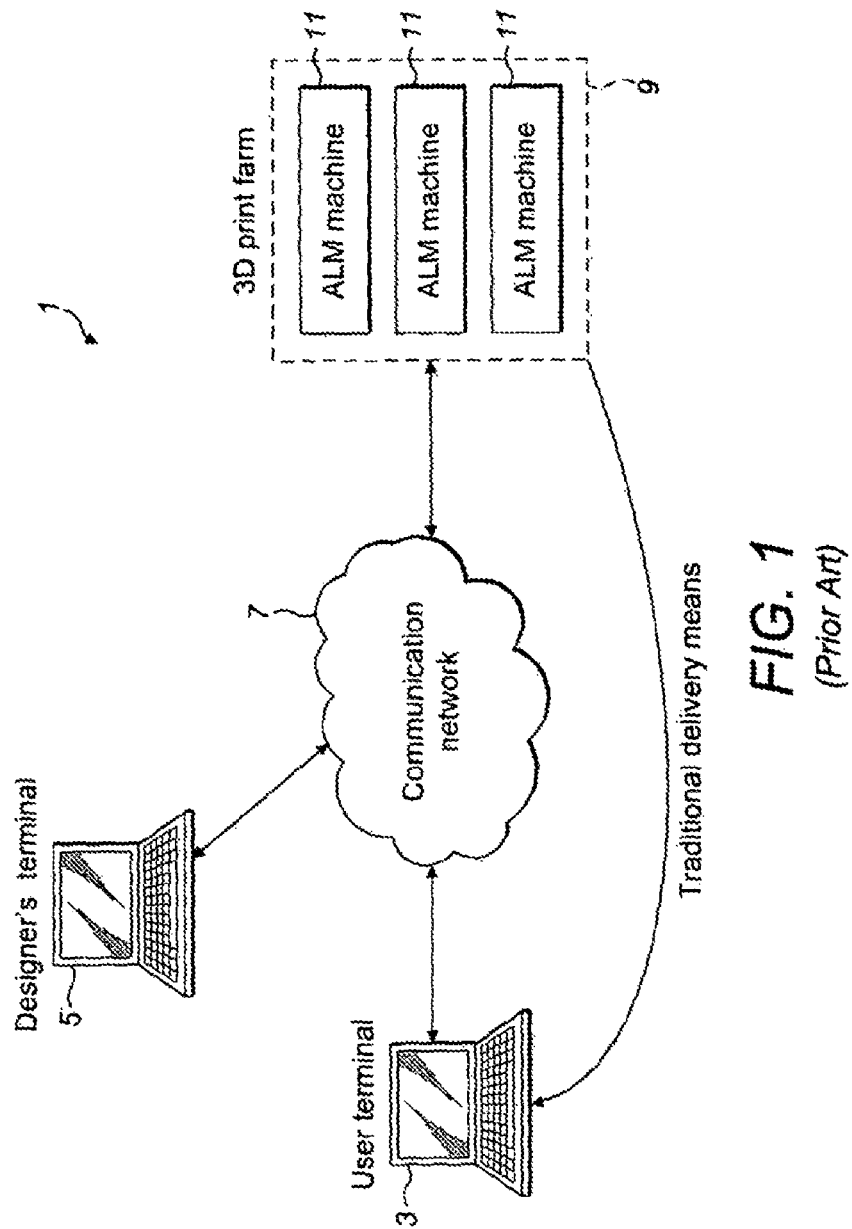
FIG. 1 is a schematic overview of a distributed computer network system known in the prior art.

FIG. 1 is a schematic illustration of a known prior art distributed computer network system 1, used to manufacture an article in accordance with a 3D design. The system comprises a user terminal and a designer terminal 5, both of which being operatively connected to a shared communication channel 7, such as the internet or any other LAN (Local Area Network) and/or WAN (Wide Area Network). Likewise, a 3D print farm, comprising one or more ALM machines 11 is also operatively connected to the shared communication network. Each one of the attached terminals (i.e. the user terminal, designer terminal, and 3D print farm) are able to communicate electronically, and transfer 3D design files between each other. A 3D design file may relate to a functional representation of a 3D object, such as an F-REP file, to a constructive solid geometry file (CSG), to a more specific boundary representation (B-REP), to a surface mesh, or to any other electronic representation of a 3D object.

A user may commission a designer to create a proprietary design, which is stored as a 3D design file, using CAD software. Once complete, the 3D design file is transferred from the designer's terminal 5 to the user's terminal 3 via the shared communication network 7. At this stage the user will also typically remunerate the designer for the commissioned design. In order to print an object in accordance with the 3D design, the 3D design file is transferred from the user's terminal 3 to the 3D print farm 9, where an article is manufactured (i.e. printed) in accordance with the design. In the ensuing description the terms manufacturing and 3D printing will be used interchangeably for referring to the act of manufacturing a 3D object in accordance with a 3D design, using an ALM machine.

Upon receiving the 3D design file and prior to printing, the ALM machine operator converts the received 3D design file into 2D contour data. Additionally, the ALM machine operator configures the ALM machine 11 (i.e. the 3D printer) with the required parameter settings to meet the required build specifications. This typically occurs during the build preparation process. The build specification may be provided by either the user 3 or the designer 5. Build specification in the present context refers to the physical characteristics required of the printed object. For example, rigidity, weight and physical dimensions are all examples of build specifications. The build specifications may also be defined within the 3D design file. The parameter settings are effectively printer configuration settings. Only once both the 2D contour data has been generated and ALM machine 11 configured with the required parameter settings, can printing be carried out. Selection of the required parameter settings is based on the human operator's experience and personal expertise, and accordingly depending on the experience of the operator, may not always result in the best quality of printed object, especially if the operator is unfamiliar with the type of design object being printed.

In order to print an object in accordance with the 3D design, the generated 2D contour data is input into an ALM machine 11 (i.e. a 3D printer), and an article is printed in accordance with the input 2D contour data. Each 2D cross-sectional slice of the 3D design object represents one layer of the printed object.

Printed 3D articles are dispatched to the user using traditional delivery means, such as conventional mail or courier services. In this way, a user is able to obtain a made-to-order article. However, no mechanism is provided which ensures any proprietary rights present in the design are maintained and respected. Additionally, and this presents a significant inconvenience to the user, it is difficult for the user to obtain a clear manufacturing cost figure for manufacturing the printed article at the outset, since design and manufacturing are outsourced to different entities, that carry out their respective tasks independently of the other. In the present context, total manufacturing cost is intended to refer to the total costs incurred by the user for commissioning the manufacture of the 3D object. This comprises both design costs and the actual printing costs. Currently, the design costs are borne once the designer has delivered the design to the user, and the printing costs are incurred independently once the articles have been printed and delivered. To mitigate for this shortcoming, the user may negotiate costs separately at the outset with both the designer and the manufacturer. However, this may prove difficult, given that manufacturing costs will to some extent be dependent on the complexity of the design. Accordingly, the manufacturer can at best provide only cost estimates, which have some inherent uncertainty. In many applications this degree of uncertainty associated with the total manufacturing cost may not be acceptable and may dissuade users from using ALM in favour of more traditional manufacturing methods.

It is to be noted that the user and designer may be the same entity, in which case the 3D design file is generated at the user's terminal and forwarded directly to the 3D print farm for manufacture.

In the ensuing description, whilst the preferred embodiments are described in relation to ALM machines/3D printers, it is to be appreciated that the present invention is suitable for use with any type of digital manufacturing device capable of printing 3D objects. For example, this includes devices using subtractive manufacturing methods, such as milling or machining, to manufacture 3D objects. In the present context the term subtractive manufacturing is used to refer to manufacturing techniques wherein an object is printed by selectively removing material to shape the desired object. This is in contrast with additive layer manufacturing (ALM) where material is selectively added to construct the desired object. The present invention is suitable for use with printers using either one of the aforementioned manufacturing techniques despite the below description of preferred embodiments being described with respect to ALM/3D printers.

Figure 2:
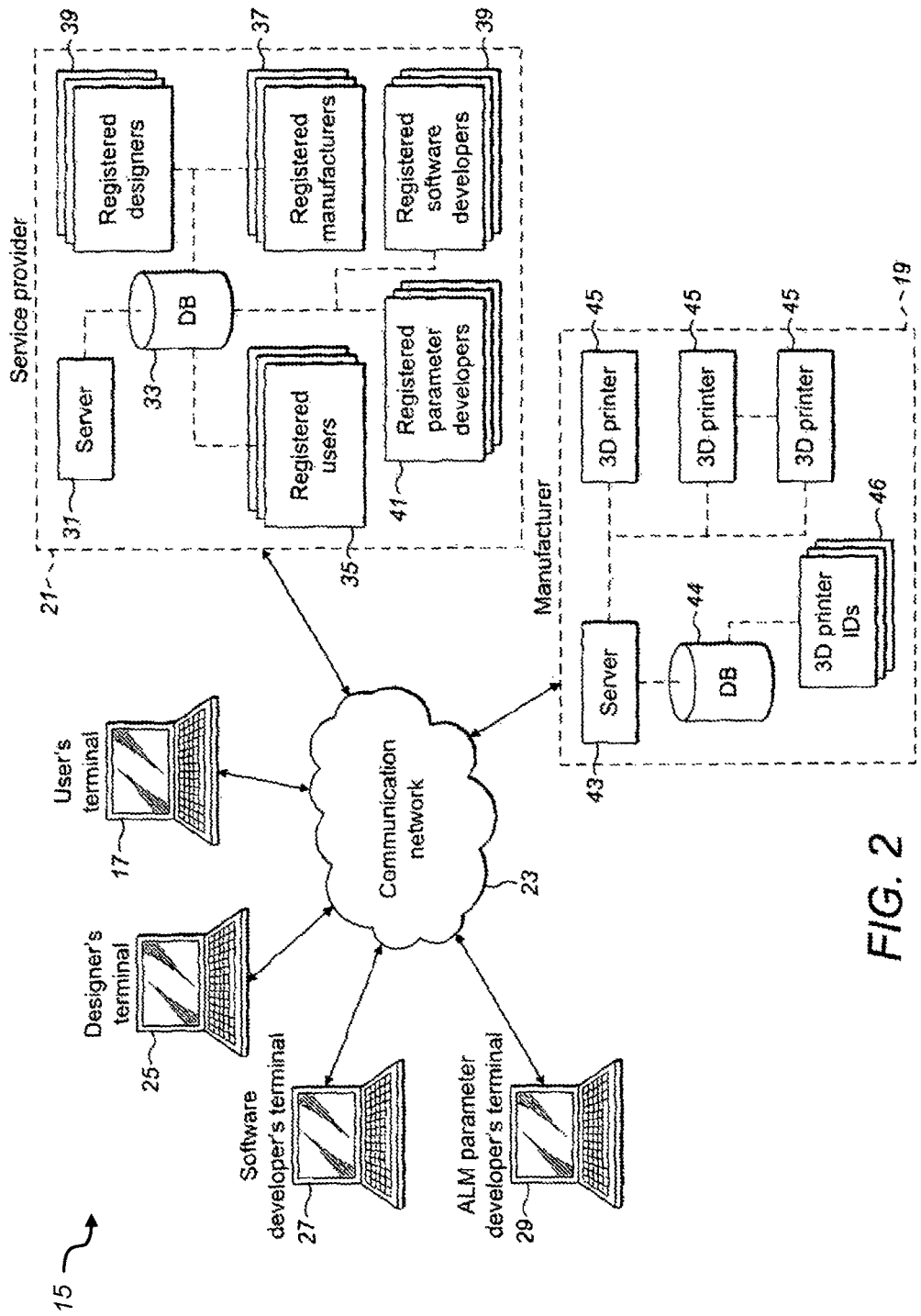
FIG. 2 is a schematic overview of a distributed computer network system for use in managing access to a 3D design file for use in printing a 3D object, in accordance with aspects of the present invention.

FIG. 2 is an overview of a distributed computer network system 15, in accordance with an aspect of the present invention. The system comprises several different entities, such as a user's terminal 17, a manufacturer 19, and a service provider 21, all operatively communicable via a shared communication network 23, such that data, such as 3D design files, may be transferred between any one of the aforementioned connected entities 17, 19, 21. The service provider 21 is an example of an authentication server, and is arranged to authenticate if an entity is authorised to access a relevant data file, such as a 3D design file. Accordingly, the terms service provider and authentication server may be used interchangeably. The shared communication network may relate to the Internet, a LAN, a WAN, or any other computer network. The system may also optionally comprise one or more of the following entities: a designer's terminal 25; a 3D software developer's terminal 27; an ALM parameter developer's terminal 29. The manufacturer 19 may effectively be a print farm, comprising one or more different operatively connected ALM Machines/3D printers 45. Accordingly, the terms 'manufacturer' and '3D print farm' may be used interchangeably to refer to the same physical entity in the ensuing description, and the term '3D print farm' is analogous to the term '3D printing bureau.' Furthermore, it is to be appreciated that the terms entity and terminal may be used interchangeably to refer to any one of the devices 17, 25, 27, 29, 19 operatively connected to the service provider 21.

The service provider 21 comprises a server 31 operatively connected to the communication network 23, enabling direct data connections and communication with any one of the attached terminals 17, 25, 27, 29 and the 3D print farm 19. In addition, the server 31 may host a website through which a user using any one of the different operatively connected terminals 17, 25, 27, 29 and 19, may interact with the service provider 21 using standard web browsers.

The server 31 is operatively connected to a database 33, which may be stored in a storage device local to the server 31, or in an external storage unit (not shown). The service provider 21 provides several different functions. For example, it provides a centralised network peer, which is entrusted with managing access rights to proprietary information comprised in the 3D design file. It also provides a centralised networked means for advertising and accessing content, such as 3D design files, ALM parameter settings, and for securely distributing content between different networked terminals. Such content may also relate to CAD software made available by a registered software developer.

Access to information comprised in a 3D design file is controlled by the service provider 21, using a combination of unique identifiers and data encryption. By unique identifiers is intended any electronically verifiable identifier. For example the unique identifier associated with a 3D printer may relate to the printer's serial number. The database 33 maintains a record of all parties registered to use the services provided by the service provider 21. Such parties may comprise, but are not limited to, registered users 17, registered designers 25, registered software developers 27, and registered ALM parameter developers 29. This information may be stored as one or more records and/or tables within the database 33. Additionally, each registered software developer's record 27 may comprise a list of all the different design software the developer is making available for use to registered users 35. In a similar fashion, each registered parameter developer's record 41 may comprise a list of all the different parameter settings available to registered users 35. Each registered designer's record 39 may comprise a list of all the different proprietary designs available to registered users 35.

Registration is required in order for each operatively connected entity to be uniquely identifiable by the service provider 21, to thereby enable the service provider 21 to manage access rights to encrypted content. For example, to manage access rights to the encrypted content of 3D design files. The registration process is described in further detail below.

The service provider may also optionally host content in one or more local storage units. For example, the service provider may host a library of 3D design files and/or ALM machine parameters, which are accessible to registered users. In this way, a registered user can simply select a desired 3D design file from the available designs, and can have an object printed in accordance with the selected design.

The 3D print farm 19 comprises a server 43, which is operatively connected to the shared communication network 23. The server 43 may itself be operatively connected to one or more different ALM machines/3D printers 45. The primary function of the server 43 is to distribute received 3D print files to the appropriate 3D printer 45 for printing. Preferably, the received 3D design files comprises a unique identifier identifying the desired 3D printer 45. Accordingly, the server 43 may comprise a database 44 which contains a list 46 of the different unique identifiers associated with each operatively connected 3D printer 45. In addition, the server is configured to construct an authentication request for forwarding to the service provider. This authentication request is used by the service provider to determine if the requesting entity is authorised to access the contents of the 3D design file. Accordingly, the manufacturer's server may comprise a constructing module arranged to construct the authentication request. In preferred embodiments described below, the authentication request comprises a request for a decryption key to decrypt the encrypted contents of the received 3D design file.

Alternatively, the server 43 may also manage how printing tasks are distributed within the print farm. For example, the server 43 may determine which 3D printers to send a specific print job to on the basis of availability, or on the basis of the required print specifications. For example, different 3D printers 45 may have different build volumes, and accordingly depending on the required object size, some printers may be more suitable for certain tasks. Similarly, some 3D printers may only be able to print using certain materials. Accordingly, the server 43 can manage how print tasks are allocated on the basis of the characteristics of the one or more connected 3D printers 45 if the received design file does not define a specific 3D printer to be used.

Optionally, and where required, the 3D print farm server 43 may also be provided with a processor configured with software to convert a received 3D design file into 2D contour data. The 2D contour data can subsequently be directly input into a 3D printer 45, and is the type of input required by the 3D printer to commence the printing process.

Figure 3:
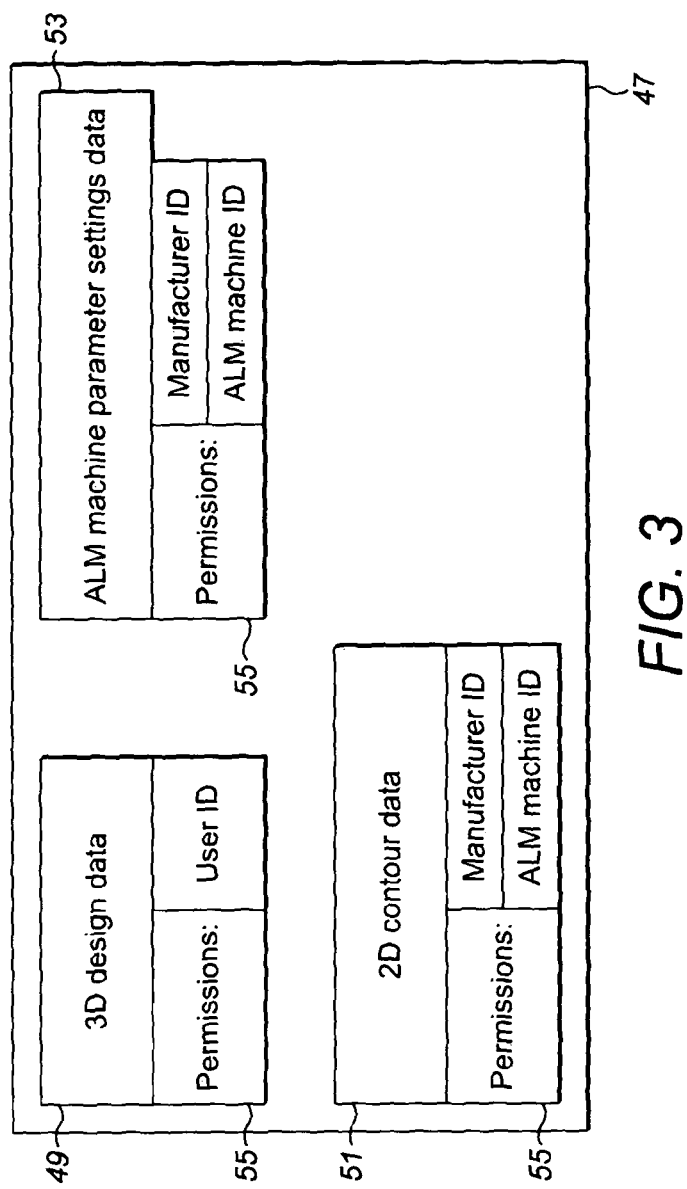
FIG. 3 is a schematic outline of a 3D design file used in accordance with the present system.

FIG. 3 is a schematic outline of the contents of a secure, encrypted 3D design file 47, used in the system outlined in FIG. 2, in accordance with a preferred embodiment. Preferably, the 3D design file comprises three different types of data, including 3D design data 49 (e.g. 3D CAD data), 2D contour data 51, and ALM machine parameter settings data 53. Each different type of data is associated with different permissions 55. The permissions define access rights to file content. In other words, the access rights define which entities 17, 25, 27, 29, 19 are allowed to access 3D design file data content, and the extent to which data may be accessed. Access rights come in one of three flavours, namely either READ, WRITE, or EXECUTE. This defines the type of access an authorised entity may have to encrypted content. For example, a READ access right means that the authorised entity is only authorised to read the associated content, whilst WRITE access rights provide the authorised entity with the ability to both read and edit content. EXECUTE access rights provide the authorised entity with the ability to print articles in accordance with the 3D design file data. In most cases EXECUTE access rights will only apply to registered manufacturers and/or designated 3D printers, since the manufacturer and/or 3D printers are the only operatively connected entities capable of printing 3D objects.

Access rights to the different data types are provided on a need-to-know basis. In other words, access rights to specific types of data are only granted if they are essential to enable the subject terminal to carry out its tasks. For example, a manufacturer (i.e. 3D print farm) 19 does not require access to 3D CAD data, if the associated 2D contour data is available in the encrypted design file. In such embodiments, the manufacturer only requires access to the 2D contour data and the ALM machine parameter settings data, since this information is sufficient to enable the manufacturer to print the 3D design object.

Conversely, in embodiments where the secure encrypted 3D design file does not comprise the 2D contour data 51, READ access rights to the 3D design data (i.e. CAD data) may be granted to the manufacturer, in order that the required 2D contour data can be generated from the associated 3D design data.

Each one of the different data types comprised in the secure 3D design file 47 is encrypted with a different encryption key. In order to access the encrypted content, a request for the decryption key is forwarded to the service provider 31, along with the requesting entities' identifier. In turn, the server 31 queries its operatively connected database 33 to determine first if the requesting entity is authorised to use the subject secure 3D design file, and secondly which types of data access rights have been granted. The service provider 21 subsequently forwards the relevant one or more decryption keys to the requesting entity, on the basis of the access rights which have been assigned to the requesting entity. For example, in the specific case of a requesting manufacturer 19 assigned with READ access rights to both ALM machine parameter settings data 53 and to 2D contour data 51, one or more decryption keys are forwarded to the manufacturer 19, enabling the manufacturer to decipher both types of encrypted data. Further details regarding how file access rights are managed by the service provider 21 in preferred embodiments follow below. However, first an illustrative example of how a user 17 would interact with the service provider 21 is set out, in order to improve the reader's understanding of the system.

Figure 4:
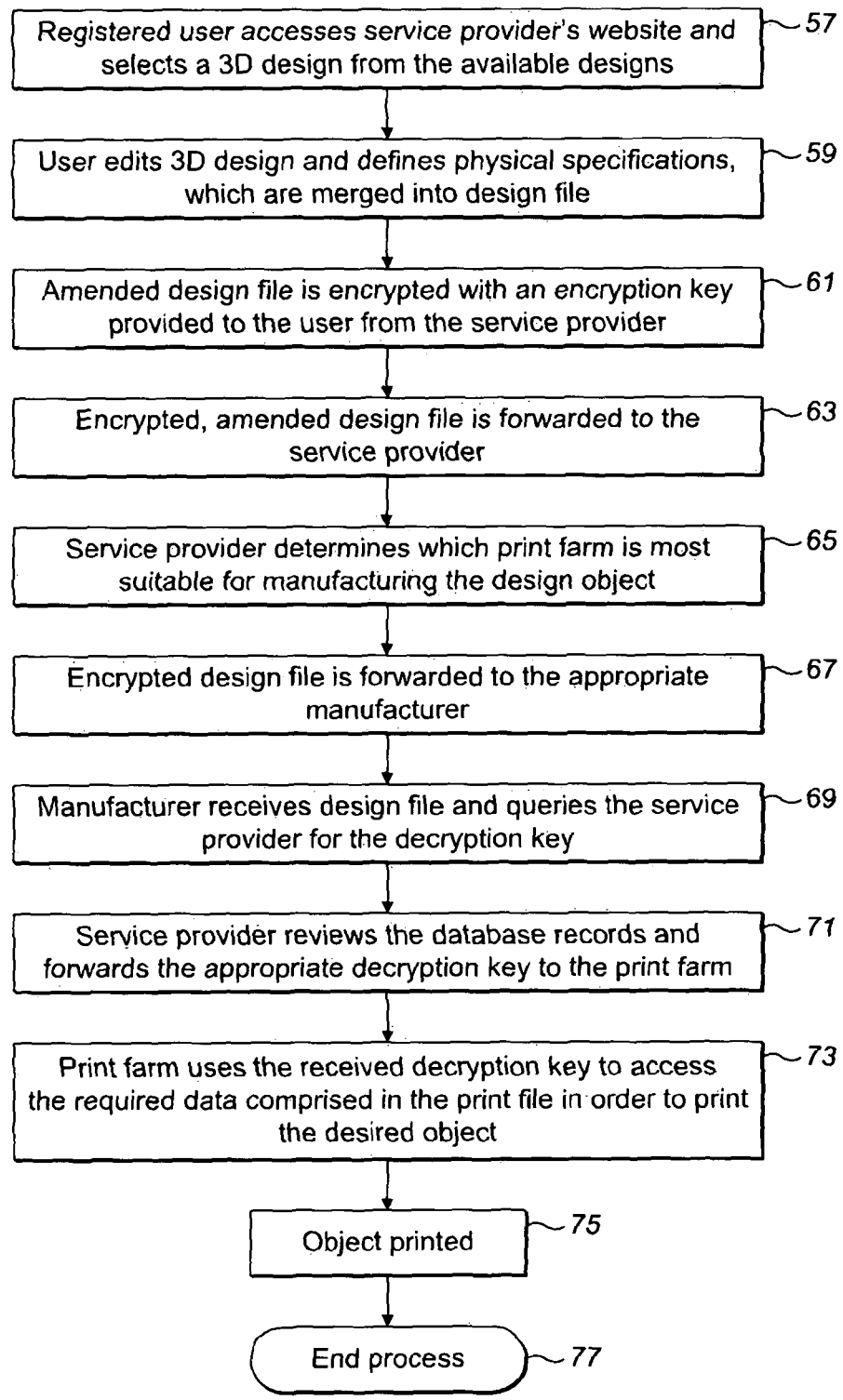
FIG. 4 is a process flow diagram illustrating an example of how a user may interact with the system illustrated in FIG. 2, in order to have an object printed in accordance with a selected 3D design.

FIG. 4 is a process flow chart providing an example of how a registered user can interact with the present system 15. A registered user on a user terminal 17 accesses the website hosted on the service provider's server 31, using a conventional web browser, at step 57, and selects a preferred 3D design from the selection of available 3D designs. The different 3D designs are all individually associated with a different unique identifier, enabling each different design to be uniquely identified.

In certain embodiments, such as in the presently described example, the available 3D designs are user-amendable, and accordingly are more akin to user-customisable 3D design templates. At step 59, the user edits the selected template and saves the resulting 3D design file. The skilled reader will appreciate however, that in alternative embodiments the 3D design can originate from any source. For example, the 3D design can be the user's own creation. The user is not restricted to using only designs advertised through the service provider's website. The only requirement is that a unique identifier associated with the design is registered with the service provider, in order to enable the service provider to manage access rights.

Additionally, the user may define the physical specifications of the design. By physical specifications is intended the physical characteristics of the resulting printed object. For example, the user may define the physical dimensions of the object. Similarly, the user may define rigidity, tensile strength, material, or any other physical characteristic of the desired 3D object. This information may be stored within the 3D design file 47 as design data 49, or may be stored within the 3D design file 47 as a separate type of data (not shown in FIG. 3) associated with separate access rights for restricting access to authorised entities only. The amended 3D design file 47 is subsequently encrypted using one or more encryption keys provided to the user 17 by the service provider 21, and is uploaded to the service provider server 31, where it is stored in local storage, at step 63. The server 31 maintains a record in its database 33, of the amended 3D design file's unique identifier, in addition to maintaining a record of the encryption key used to encrypt the design file.

The one or more encryption keys may be provided to the user at any one of steps 57 to 61, or alternatively, the user may be provided with an encryption key for use upon registering with the service provider.

The service provider's server 31 may determine, on the basis of the user-defined physical specifications, which operatively connected manufacturer/3D print farm 19 is most suitable for manufacturing the 3D object, at step 65. Each registered manufacturer has an associated record 37 stored within the database 33. Each manufacturer's record 37 comprises the unique identifier associated with the manufacturer. In addition, preferably each record also comprises a list of the different 3D printers 45 available to the selected manufacturer. In turn, each one of the 3D printers 45 is also associated with a unique identifier, which may be stored in the manufacturer's record 37. In this way, each manufacturer's database record 37 comprises a full listing of each individual 3D printer 45 available to the manufacturer, along with the printing capabilities of each printer 45. In this way, information comprised within a manufacturer's database record 37 may be used by the server 31 to determine not only which manufacturer 19 is best suited to print the 3D object, but also which specific 3D printer 45 available to the manufacturer is best suited, by comparing the user-defined physical specifications with the defined printing capabilities of each printer 45.

Alternatively, the user may select the specific manufacturer 19 and the specific 3D printer 45 to be used for printing the 3D object. Information regarding the different available manufacturers and the associated 3D printers may be made available to the user via the service provider's hosted website. In such embodiments, the user may specify the manufacturer 19 and 3D printer 45 to be used for printing, in which case step 65 is omitted. Instead, information uniquely identifying the user's selected manufacturer and 3D printer is communicated to the service provider 21, at step 63, along with the encrypted 3D design file. Optionally, information identifying the user-selected manufacturer and associated 3D printer may be comprised within the 3D design file itself. For example, by including the unique identifiers associated with respectively the user-selected manufacturer and the user-selected 3D printer within the 3D design file. Upon receipt of the encrypted 3D design file, and in place of step 65, the service provider server 31 obtains the unique identifier associated with the user-selected manufacturer and 3D printer comprised within the encrypted file. The server 31 performs a lookup operation to identify the relevant registered manufacturer record 37, wherefrom the relevant forwarding address information, such as destination IP (internet protocol) address or similar, is obtained. In this way, the service provider can forward the 3D design file to the appropriate manufacture and/or 3D printer.

Returning to the example outlined in FIG. 4. Once the most suitable manufacturer and the associated 3D printer have been identified, the encrypted design file is forwarded to the manufacturer, at step 67. In certain embodiments, the 3D printer identifier may be unencrypted, such that upon receipt, the manufacturer server 43 can readily identify the specific 3D printer selected to print the 3D design file 47, and forward the design file to the associated printer. Alternatively, the 3D design file may be forwarded to the appropriate manufacturer using any electronic file transfer medium, such as e-mail. In such embodiments, the 3D design file may be transferred directly from the user terminal 17 to the manufacturer 19.

Upon receipt of the encrypted 3D design file 47, at step 69, the manufacturer server 43 queries the service provider server 31 for the decryption key required to access the encrypted content of the 3D design file 47, and in particular to access the 2D contour data and the ALM machine parameter settings data 53. Preferably, the request comprises the unique identifier of the encrypted 3D design file, in addition to both the unique manufacturer and the 3D printer identifiers. Otherwise, the unique identifiers are transferred to the service provider's server 31 separately from the request.

The service provider server 31 reviews the received decryption key request, and queries the operatively connected database 33 to determine if the requesting entity (the manufacturer) is authorised to access the encrypted contents of the design file, and in particular to determine which contents of the design file are accessible to the manufacturer and the level of access (e.g. READ, WRITE or EXECUTE). For example, using the 3D design file's unique identifier comprised in the received request, the server 31 queries the database 33 to identify the relevant record associated with the design file. The associated record may comprise a list of all the unique identifiers of the different manufacturers authorised to access the 3D design file, and the specific type of access rights granted to each manufacturer. The database record may also define which specific 3D printers associated with each authorised manufacturer, are authorised to access encrypted file content and the level of access. Most importantly, the relevant record specifies the decryption key for use by each authorised manufacturer and/or 3D printer. The precise order in which data is stored within the service provider's database 33 is not critical to the present invention. Similarly, the order in which data is queried is also not critical. Instead, what is relevant is that the query establishes whether an association exists between the 3D design file's unique identifier and the manufacturer's/3D printer's unique identifier. Preferably, the 3D design file's unique identifier is user-dependent. For example, in embodiments where a user generated design file is forwarded for printing, the unique identifier associated with the specific design file will be uniquely associated with one specific user identifier. In this way, the service provider can immediately identify the authorised user on the basis of the received unique 3D file identifier. Alternatively, where the unique 3D file identifier is not associated with a single user identifier, the database query also comprises the user's unique identifier. In which case, the query establishes whether an association exists between respectively the user identifier, the 3D file identifier and the manufacturer/3D printer's identifier.

Preferably, the decryption keys are entity specific, such that different decryption keys are associated with different requesting entities. In this way, different manufacturers need to use different decryption keys to access encrypted file content. One way of achieving this is by using a decryption algorithm (i.e. a cipher) which is dependent on the manufacturer's and/or 3D printer's (or other requesting entities) unique identifier. In other words, the decryption algorithm incorporates a unique variable associated with the requesting entity, such that the decryption key is effectively entity dependent. In other words, the decryption key may only be used by the authorised entity to correctly decrypt the encrypted file. If used by an unauthorised entity, the decryption key will not correctly decrypt the encrypted file. This ensures that only the authorised manufacturer and/or 3D printer can correctly decrypt and access the encrypted 3D design file data, and prevents the recycling of decryption keys between different entities. Similarly, the decryption key only decrypts design file content which the subject entity is authorised to access. For example, the decryption key used by an authorised manufacturer will preferably only decrypt design file content that is required by the manufacturer, such as 2D contour data and ALM parameter settings data. In other words, the decryption keys are configured to decrypt design file content relevant to the associated entity.

Returning to the discussion of FIG. 4, once the relevant record has been identified, the server determines if the requesting manufacturer has been authorised to access one or more types of data content comprised in the 3D design file, at step 71. If the obtained database record confirms that the requesting manufacturer has been authorised to access one or more of the different data contents of the 3D design file, then the associated decryption keys are subsequently forwarded to the manufacturer and/or 3D printer.

Upon receipt of the decryption keys, the manufacturer 19 and/or 3D printer 45 decrypts the encrypted content of the 3D design file, to access the 2D contour data and ALM machine parameter settings data. This information is required by the 3D printer 45 to print a 3D object having the user defined physical characteristics, at step 73. The 3D object is subsequently printed at step 75, and the process is ended at step 77. Traditional delivery means are subsequently used to deliver the printed object to the user 17. Accordingly, the service provider database may also comprise delivery details for each registered user. These delivery details are forwarded to the manufacturer such that the printed objects can be delivered to the appropriate address. Details regarding how the service provider may control the number of objects printed in accordance with the 3D design file, follow below after a description of a typical registration process.

Figure 5:
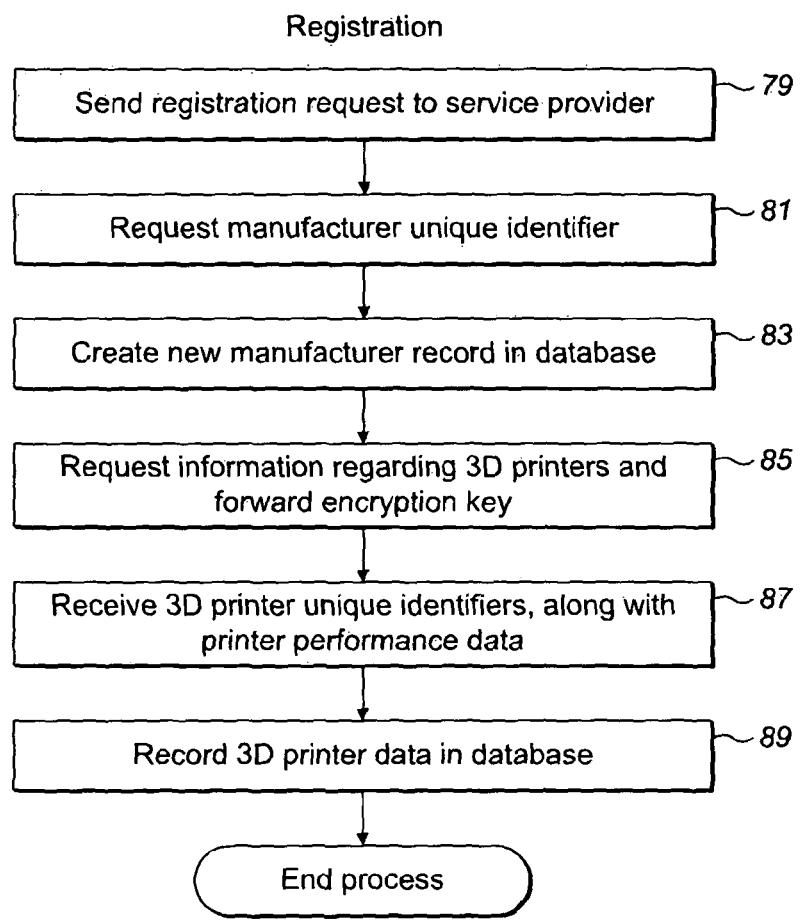
FIG. 5 is a process flow chart illustrating an example of how a manufacturer may register with the service provider illustrated in FIG. 2.

FIG. 5 is a flow chart, providing an example of a typical registration process involving a manufacturer 19. Although the present example describes the registration process of a manufacturer, the registration process is substantially identical for other registering entities.

As mentioned previously, registration is required in order to benefit from the functionality afforded by the service provider 21, and to enable the service provider to carry out its decryption key distribution function. The registration process is initiated by the manufacturer forwarding a registration request to the service provider 21 and in particular to the service provider's server 31, at step 79. For example, the registration process may be initiated by accessing the service provider's website and following the onscreen registration instructions. Upon receipt of the registration request, the service provider's server 31 responds by requesting a unique identifier from the manufacturer 19, at step 81. Preferably, the unique identifier is defined in hardware for improved security. Alternatively, the unique identifier may be the manufacturer's MAC (Media Access Control) address.

Optionally, the unique identifier may be assigned by the service provider 21. In such embodiments, in place of step 81, the service provider's server 31 generates a unique identifier which is forwarded to the manufacturer 19. In all subsequent communications with the service provider 21, the manufacturer uses the assigned identifier.

Returning to the example outlined in FIG. 5, once the service provider's server 31 has received the manufacturer's unique identifier, a database record 37 for the manufacturer is created and stored in the service provider's database 33, at step 83. The manufacturer's record comprises the manufacturer's unique identifier.

Once the manufacturer's database record 37 has been created, the server 31 requests information regarding the 3D printer's 45 that the manufacturer 19 would like to register with the service provider, at step 85. The requested information comprises requesting a unique identifier, associated with each 3D printer 45 the manufacturer would like to register. For example and as mentioned above, this identifier may relate to the printer's MAC address. This provides the service provider with a means for uniquely identifying different 3D printers. Further information which may be requested is printer performance data. For example, this might comprise information regarding any one or more of the following: the available printing volume, which limits the physical dimensions of objects that may be printed with the subject printer; the type of materials which may be used for printing; laser spot size, or in other words the range of focal spot sizes the subject printer can output; laser output power; laser wavelength, and/or the range of laser output wavelength; and the one or more different build algorithms the printer is configured to use.

Preferably, at this stage the manufacturer 19 is also provided with a cryptographic encryption key, which can be used to encrypt all subsequent data communications between the service provider 21 and the manufacturer 19, and/or data communications between the manufacturer 19 and any other operatively connected entity 17, 25, 27, 29. The encryption key may be concatenated within the service provider's request at step 85, or it may be forwarded to the manufacturer in an independent step not illustrated in the process flow chart of FIG. 5. A copy of the encryption key is stored in the manufacturer's database record 37. Where asymmetric cryptography is used, a copy of the decryption key, which is different from the encryption key, is also stored in the manufacturer's database record 37 to enable the service provider 21 to decipher encrypted data communications received from the manufacturer 19.

The unique identifiers associated with each 3D printer are received at step 87, along with the optional associated printer performance data. This data is stored in the registered manufacturer's database record 37, at step 89, and the registration process is completed.

As mentioned previously, the registration process associated with the software developer 27, the ALM parameter developer 29, the designer 25 and the user 17 are substantially the same as the above described manufacturer registration process.

During the designer registration process instead of providing information regarding the 3D printers that are to be registered at step 85, the designer provides the 3D design files, which are to be made available for use through the service provider. Preferably the transferred design files are encrypted for security purposes.

Alternatively, the design files may be stored locally to the designer's terminal 25. In such embodiments, only a unique identifier associated with each different design is uploaded to the service provider, along with a representative image for display on the service provider's website. In such embodiments, when a user 17 selects a specific design for printing, the service provider simply queries the database using the selected design's unique identifier to determine the associated registered designer 25. Once identified, the service provider can instruct the designer to forward the user-selected design to the appropriate user's terminal 17 for customisation, or alternatively, can instruct the designer to forward the design directly to the manufacturer 19. In effect, the service provider acts as a centralised server, routing data files between the relevant operatively connected terminals, and for distributing decryption keys.

During the ALM parameter developer registration process, in place of step 85, the service provider 21 requests information regarding the one or more different ALM machine parameter settings that are to be made available. In turn the ALM parameter developer either uploads the different parameter settings, or stores them locally and provides the service provider with the unique identifiers required to identify the ALM parameter settings, as described above in relation to the designer.

Similarly, during the software developer registration process, in place of step 85, the service provider requests information regarding the one or more different software products that are to be made available to the user. In response, the software developer either uploads the different software products to the service provider, or stores them locally and uploads unique identifiers enabling the one or more different software products to be identified. In those embodiments where the software products are stored local to the software developer's terminal 27 and once a user 17 has selected a specific software product to use for editing a selected design file, the associated unique identifier is forwarded to the software developer. The unique identifier is used by the developer to identify the selected software product, which may then be transferred directly from the developer to the user. Optionally, the unique identifier associated with the software product used to either create and/or edit a 3D design file, may be stored within the resulting 3D design file. In this way, it is possible to determine the software product that was used to author and/or edit a 3D design file.

Alternatively, cloud computing may be used. In such embodiments, the user is able to use selected software, which is hosted remotely to the user terminal 17. For example, the software may be hosted local to the software developer's terminal 27, or it may be hosted on the service provider's server 31. Since cloud computing is well known in the art, it is not necessary to provide further details regarding this embodiment.

Figure 6A:
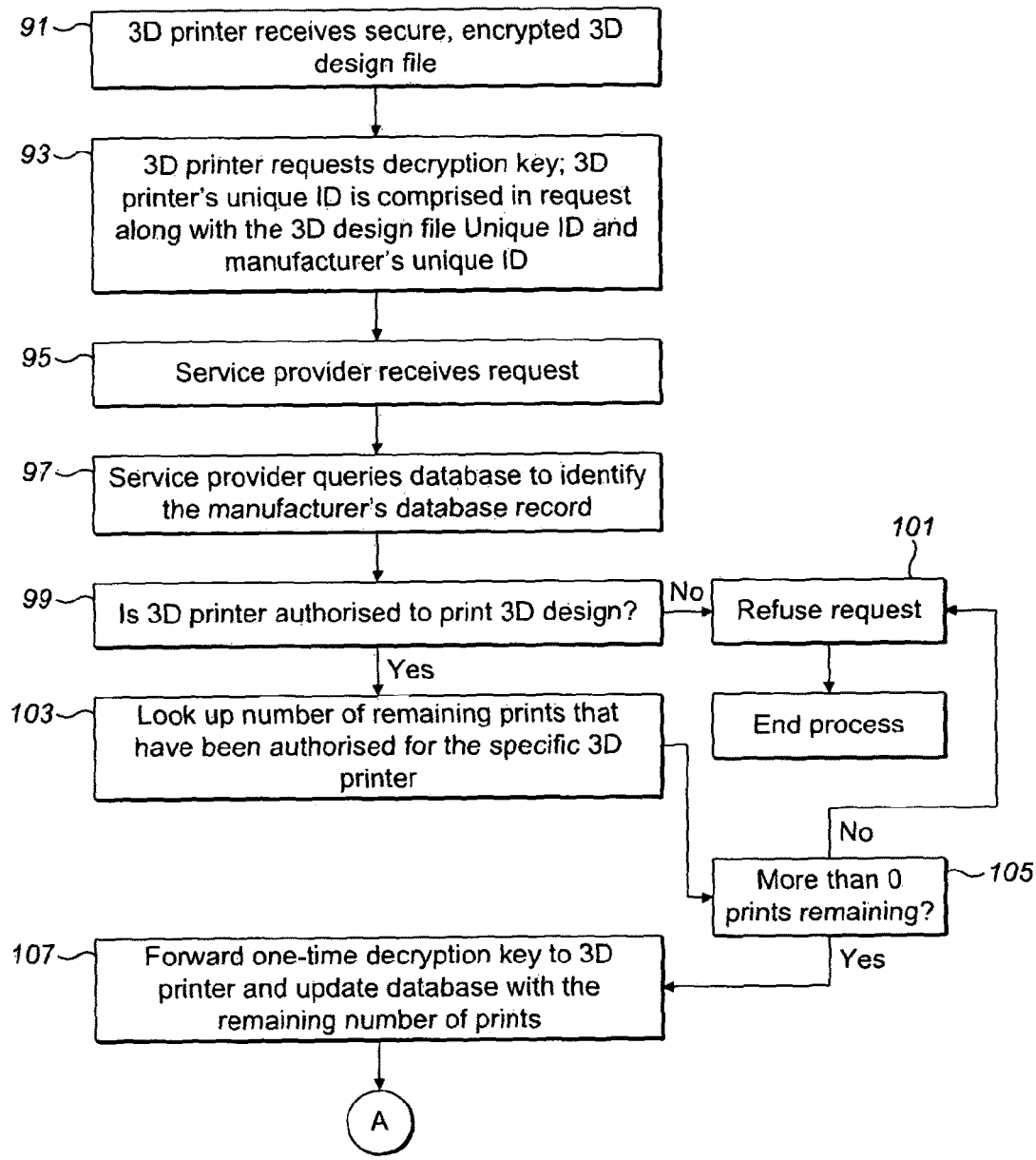
FIGS. 6a and 6b are a process flow chart illustrating how the number of objects printed in accordance with a received 3D design file by a manufacturer may be controlled.
Figure 6B:
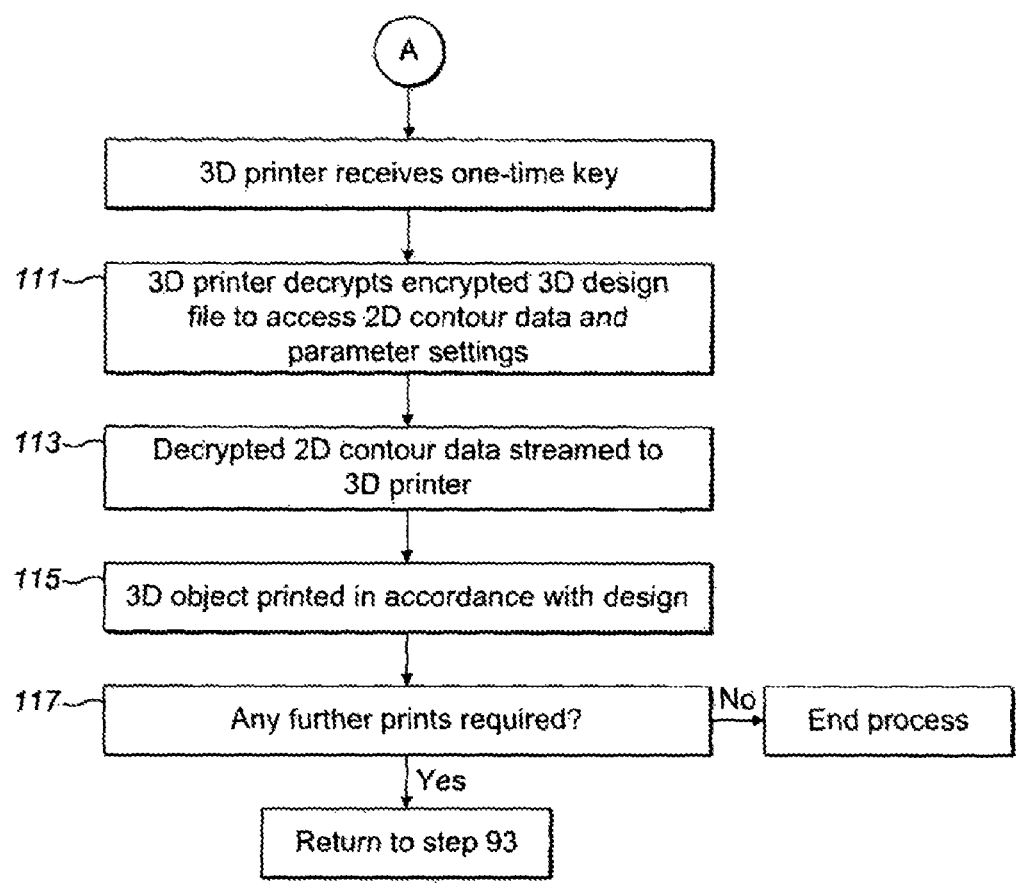

FIG. 6 is process flow chart illustrating how the service provider is able to control and limit the number of objects printed by a manufacturer in accordance with a user-selected 3D design file. Specifically, the illustrated process flow chart provides further details of steps 69 through 75 of FIG. 4.

The 3D printer 45 receives the user-selected encrypted 3D design file 47, at step 91. In order to access the 2D contour data 51 and the optional ALM parameter settings data 53, the 3D printer 45 issues a decryption key request to the service provider 21, at step 93. This request comprises the manufacturer's unique identifier, the 3D printer's unique identifier and the 3D design file's unique identifier. The service provider 21, and specifically the server 31 receives the 3D printer's request, at step 95. The server 31 queries the operatively connected database 33 using the manufacturer's unique identifier to identify the associated manufacturer's database record 37, at step 97. The manufacturer's database record 37 comprises a list of all the associated registered 3D printers 45, and the 3D design files each 3D printer 45 is authorised to print. Alternatively, the database 33 may be queried using the 3D design file's unique identifier, to identify the 3D design file's database record (not shown in FIG. 2), which in turn will comprise a list of unique identifiers associated with each 3D printer authorised to print the 3D design file. For present purposes it is irrelevant which database record is queried for. What is relevant, is that an association between the 3D design file's unique identifier, the manufacturer's unique identifier, and the 3D printer's unique identifier is identifier. For example, this might comprise querying for and identifying a database record associating authorised printers with 3D design files. This enables the service provider to determine if the specific manufacturer and/or 3D printer have been authorised to print the 3D design file, using the associated unique identifiers. The skilled reader will appreciate that several different methods may be used to query the database, two of which have already been outlined above, and further alternatives are envisaged and fall within the scope of the present invention.

Returning to the example illustrated in FIG. 6, once the manufacturer's database record has been identified, the server 31 determines, at step 99, if the manufacturer's 3D printer is authorised to print the subject 3D design file. This is determined by reviewing the database record. If the manufacturer's 3D printer has been authorised to print the specific 3D design file, then an entry will be present in the record to indicate that the specific 3D printer has been granted EXECUTE access rights, with reference to the unique identifier associated with the 3D printer. For example, the database record may comprise a list of all the unique identifiers associated with different 3D design files that the 3D printer is authorised to print. If the unique identifier associated with the present 3D design file is present in this list along with an indication that EXECUTE level access rights have been granted, then this confirms that the 3D printer is authorised to access and to print an object in accordance with the subject 3D design file.

If the server 31 determines that the 3D printer is not authorised to access the subject 3D design file, due to the absence of the 3D printer's unique identifier in the identified database record, then the request is refused, at step 101 and the present process is terminated. The 3D printer 45 and the associated manufacturer 19 are not provided with the decryption key required to access the 3D design file's encrypted data content, and accordingly are unable to print a 3D object in accordance with the 3D design.

Alternatively, if the server 31 determines from the identified database record 37, that the 3D printer 45 is authorised to print the subject 3D design file, at step 99, then the server 31 can determine from the identifier database record 37 the number of remaining prints that the 3D printer is authorised to print, at step 103. In particular, at step 105, the server 31 determines if the number of authorised prints is greater than 0. If the number of authorised prints is greater than 0, then the process proceeds to step 107. Otherwise, the request is refused at step 101, and the process is ended. The number of authorised prints may be selected by the user during the design selection process. For example, when selecting a design for printing, the user may also confirm how many objects are to be printed in accordance with the design. Information associated with the number of prints may be stored within the 3D design file itself, and/or may be simply stored in one of the service provider's database records.

If more than '0' authorised prints remain, the server forwards a one-time use decryption key to the 3D printer 45, at step 107. Additionally, the server 31 updates the appropriate database record 37 with the remaining number of authorised prints. In the present context, the term 'one-time use decryption key' refers to a decryption key that may be validly used only once. After it's initial use, the one-time use decryption key expires and can no longer be used for decryption purposes. The server 31 updates the appropriate database record 37 to maintain an up to date log of the forwarded one-time use keys. For example, this log may be comprised within the associated manufacturer's database record. The log is updated each time a key is forwarded to the 3D printer 45.

Upon receipt of the one-time use decryption key, the key is used by the 3D printer 45 to decrypt the encrypted 3D design file, at step 111. The one-time use decryption key is configured to decrypt selected 3D design file content required by the 3D printer for printing purposes. For example, in the present case, the 3D printer only requires access to the 2D contour data 51 and to the ALM machine parameter settings data 53, comprised in the 3D design file 47, in order to print the required 3D object. Accordingly, the received one-time use decryption key is arranged to only decrypt this 3D file data content. In this way, the confidentiality of proprietary information is maintained, and is strictly shared to registered entities on a need-to-know basis.

The decrypted 2D contour data is preferably streamed to the 3D printer, at step 113, or is otherwise maintained in temporary storage in order to prevent the 3D printer from storing the decrypted data in permanent memory for later use. This ensures that the 3D printer must actively request a new one-time decryption key for each print it wishes to make, and thereby enables the service provider to effectively control the number of prints carried out by the 3D printer.

In alternative embodiments, a 3D printer may simultaneously print several objects in accordance with a specific 3D design file. In such embodiments, the number of objects to simultaneously print will comprised within the 3D printer's control software, during configuration of the virtual build platform. The skilled reader will appreciate that by virtual build platform is intended the initial configuration of the 3D printer, wherein the printer effectively determines how to build the 3D object, and how the available printer volume is to be used. The printer's control software monitors the number of objects being configured for printing in the virtual build platform, and will automatically forward this information to service provider 21. In turn, the service provider 21 will use this information to maintain up to date records, and specifically to monitor the number of remaining objects that may be printed by the specific 3D printer in accordance with the 3D design file.

Similarly, the 3D printer's control software may record the number of objects being configured for simultaneous printing in the virtual build platform, and will compare this number with the number of authorised prints indicated in the received 3D design file. If the number of prints to be carried out, as determined from the virtual build platform, exceeds the total number of authorised prints defined in the 3D design file, then the 3D printer's control software terminates the virtual build platform configuration process. In other words, the 3D printer is prevented from printing a 3D object. This embodiment is also convenient for use in situations where bandwidth is limited. In this way, rather than the 3D printer having to continuously request a new one-time use decryption key each time the 3D printer wishes to print an article in accordance with the 3D design file, the initially received decryption key can be used until the number of authorised prints has been exhausted.

Returning to embodiment illustrated in FIG. 6, the 3D object is printed by the 3D printer in accordance with the streamed 2D contour data, at step 115. The 3D printer subsequently determines, at step 117, if any further prints are required. If no further prints are required the process is ended. If instead further prints are required, then steps 93 through 117 are repeated. In effect, the 3D printer must request and obtain a different one-time use decryption key for each print it wishes to carry out. Furthermore, since decrypted 3D design file data is temporaneous, in other words it exists in decrypted form for a temporary period of time, the 3D printer cannot store the decrypted data in permanent memory, to avoid having to request subsequent one-time use decryption keys for printing purposes. In this way, the centralised service provider is able to control the number of 3D objects that may be printed in accordance with a proprietary 3D design file.

In preferred embodiments the decrypted 2D contour data is streamed to the 3D printer, as mentioned above. This ensures that at any moment in time, only a small portion of the 2D contour data is in decrypted form, which further improves its security.

In preferred embodiments the service provider is arranged to automatically determine which ALM machine parameter settings are best suited for use in printing a specific 3D design. For example, the server 31 may be configured with a processor (not shown in FIG. 2) for the purposes of automating this task. During the design stage, and once the user has selected a design for printing, the technical specifications must also be defined. This comprises defining the physical characteristics required of the printed 3D object. The physical characteristics may relate to any one or more of the following: physical dimensions including tolerances; build material to be used in printing; tensile strength; rigidity etc. The preceding is not an exhaustive list of the different types of physical characteristics, but only a selection of common characteristics, and it is to be appreciated that in the present context technical specification refers to any physical characteristic required of the ensuing printed object.

The technical specifications are preferably stored within the 3D design file 47 and may be comprised within the 2D contour data 51, to ensure they are accessible to the authorised 3D printers 45. The service provider database 33 also comprises registered parameter developer records 41. Each one of these records comprises a list of the different parameter settings available for the selected developer, along with the compatible registered 3D printers the settings can be used with. In turn, each parameter setting is associated with one or more physical characteristics and/or ranges of physical characteristics which are obtainable using the selected parameter settings. The reader will recall that ALM machine parameter settings relate to the variable 3D printer settings which must be defined in order to print a 3D object. These parameters may relate to output laser power; laser mode of operation (e.g. continuous or pulsed); laser focus spot size and any other printer variable which affects the characteristics of the resulting printed object.

By maintaining detailed records of the available parameter settings and the associated achievable object characteristics, the server 31 is able to identify and determine the best suited ALM parameter settings for use in achieving the user-defined technical specifications. For example, this may be achieved by querying the database 33 to identify the one or more parameter settings comprised within the registered parameter developer records 41, which meet the user-defined technical specifications.

In more sophisticated embodiments, artificial intelligence (AI) and/or neural networks can be used to improve the server's ability to select the most appropriate ALM parameter settings on the basis of the user-defined technical specifications. In such embodiment the server 31 comprises an AI module and/or a neural network module. Similarly, AI and/or neural networks can be used to propose a list of suitable ALM parameter settings, on the basis of the user-defined technical specifications. The user subsequently selects the preferred settings from the provided list.

Once the server 31 has selected the most appropriate ALM parameter settings, this data is stored within the 3D design file as illustrated in FIG. 3. This reduces the number of different data files that are forwarded to the manufacturer 19 for printing.

The service provider 21 may also be used to manage royalty payments for use of proprietary information, such as proprietary 3D design files. In such embodiments, the designer may define a royalty rate for use of his/her proprietary design. This royalty rate may be stored within the service provider's database 33. Similarly, the software developer and the ALM parameter developer may do the same and specify respectively a royalty rate for use of the proprietary design software and a royalty rate for use of the ALM parameter settings. The royalty rates are stored in the respective database records. Preferably the royalty rate is defined per manufactured 3D object. In this way, the user is able to obtain a total cost estimate for manufacturing the desired 3D object on the basis of the volume of printed objects required. This total cost estimate incorporates all aspects of the product manufacturing process, including both the design and printing stages.

Optionally, the royalty rates may also be defined within the 3D design files. These royalty rates may then be transferred through the different stages involved in the manufacture of the design object, such that the royalty rates can be logged by the ALM machine in addition to being logged by the service provider. The royalty rates can then be presented to the user and/or to the operator of the ALM machine on a periodic basis. In this way, the accumulation of costs can be tracked during the manufacturing process. The royalty rates define the payments that need to be made to the different entities involved in the design and manufacture of the 3D object.

Furthermore, a registered user's database record 35 may comprise billing details, such that upon commissioning a design for printing, the total incurred costs are directly debited from the user on the basis of the provided billing details. Similarly, received royalty payments can be automatically distributed to the different entities. For example, received royalty payments can be automatically forwarded to both the relevant designer and the relevant manufacturer, on the basis of the unique designer identifier and the unique manufacturer identifier associated with the specific 3D design file. In this way, the service provider 21 is able to manage the allocation of received royalty payments.

The present system may also be used to track the status of a manufacturing process. For example, in preferred embodiments the manufacturer and/or 3D printer requests a one-time use decryption key for each object for printing from the authentication server (i.e. the service provider 21) as previously mentioned. Since the authentication server maintains a log of each request for a decryption key received from the manufacturer/3D printer, this log can be used to provide a printing status update to the user. For example, if no requests have been received, it can be determined that the printing process has not yet begun. In contrast, if the log indicates that five requests have been received, and a total of 10 prints have been authorised, the status may indicate the number of objects printed to date and may also indicate how many objects remain to be printed.

Optionally, each printed object may be watermarked with the associated unique 3D file identifier, and/or with a unique serial number. In this way, it is possible to determine from the printed object, the 3D design file used to print the object, and subsequently the 3D printer and/or manufacturer that printed the object.

The present invention can be used in combination with any type of 3D design, such as 3D lattice designs, 3D skin designs, 3D mechanism designs, 3D free-form designs, 3D pipe designs, 3d hybrid designs, and any combination thereof.

ALM machine manufacturers may also register with the service provider. The term 'ALM machine manufacturers' relates to the manufacturers of 3D printing hardware. Accordingly, it is envisaged that ALM machine manufacturers can register one or more different models of printer along with associated parameter settings. In this way, ALM machine parameter settings and printer performance data, can be obtained directly from the associated ALM machine manufacturers and forwarded to the appropriate manufacturer 19 for use in printing. In such embodiments, royalty payments can also be directed to the relevant ALM machine manufacturers. One advantage associated with this embodiment is that it allows alternative business models to be adopted by ALM machine manufacturers. For example, rather than selling printers on the basis of a one-off payment, payment may be defined in terms of a royalty dependent on the number of objects printed with the printed. In other words, a royalty payment is made to the ALM machine manufacturer each time their printer is used to print an object.

The skilled reader will also appreciate that in alternative embodiments, the 2D contour data may be transmitted in a separate file to the 3D design data. In other words, it is not a critical requirement that the 2D contour data is comprised in the 3D design file forwarded to the manufacturer for printing. In such embodiments, the manufacturer may only require the 2D contour data file. The precise details of how 2D contour data is transferred to the manufacturer is not relevant to the present invention, and alternative methods are envisaged and fall within the scope of the present invention.

Similarly, in alternative embodiments, it is envisaged that the ALM parameter settings could be generated at the 3D printer, during the build preparation process.

It is to be appreciated that the herein described preferred embodiments are presented for illustrative purposes only and are not limiting to the invention. Further alternative embodiments not disclosed herein, but which fall within the scope and spirit of the present invention are also envisaged.

The invention claimed is:

1. A computer-implemented method of printing a three-dimensional (3D) article from a 3D design file describing a 3D design, the method comprising:
    receiving, at a computer processor, the 3D design file in encrypted format, the 3D design file comprising a unique design file identifier and a unique 3D printer identifier identifying a 3D printer capable of printing a three-dimensional article in accordance with the 3D design file;
    constructing, using the computer processor, an authentication request for authenticating use of the design file with the 3D printer specified by the 3D printer identifier, the request including the unique design file identifier and the unique 3D printer identifier;
    transmitting the authentication request from the computer processor to an authentication server;
    receiving, at the computer processor, an authentication response from the authentication server, the response enabling printing of the article from the 3D design file on the specified 3D printer, the response comprising a decryption key arranged to decrypt the encrypted 3D design file;
    using the decryption key, at the computer processor, to decrypt the received encrypted 3D design file, comprising decrypting two-dimensional (2D) contour data included in the 3D design file, and sending the decrypted 3D design file to the 3D printer associated with the unique 3D printer identifier; and
    printing the article in accordance with the decrypted 2D contour data at the 3D printer.

2. The method of claim 1, wherein the decryption step comprises decrypting a 3D printer configuration file included in the 3D design file, and the method further comprises:
    configuring, using the computer processor, the 3D printer in accordance with the configuration file; and
    the printing step comprises printing the article in accordance with the configuration specified by the configuration file.

3. The method of claim 2, wherein the configuring step comprises specifying the material to be used by the 3D printer for the printing of the article.

4. The method of claim 2, wherein the 3D printer comprises a laser and the configuring step comprises specifying the optical power output of the laser.

5. The method of claim 2, wherein the 3D printer comprises a laser and the configuring step comprises specifying the focal spot size of the laser.

6. The method of claim 1, wherein the decryption key is a one-time use decryption key arranged to expire after a single use, and the method further comprises:
    transferring, using the computer processor, a second authentication request to the authentication server; and
    receiving, at the computer processor, a second authentication response from the authentication server, the response comprising a second one-time use decryption key arranged to decrypt the encrypted 3D design file.

7. The method of claim 1, wherein a received authentication response only enables a single article to be printed from the 3D design file.

8. The method of claim 1, wherein an authentication response only enables a predetermined plurality of articles to be printed from the 3D design file, and the method further comprises:
    maintaining, at the authentication server, a count of the number of copies of the article that are printed;
    determining, at the authentication server, when the predetermined plurality of copies have been printed; and
    preventing, using the computer processor, further copies of the article being printed from the 3D print file until a further authentication response is received from the authentication server.

9. The method of claim 8, further comprising notifying the authentication server, using the computer processor, when the predetermined plurality of articles has been printed.

10. A computer-implemented method of authenticating the printing of a three-dimensional (3D) article at a 3D printer according to a 3D print file describing a three-dimensional design, the method comprising:
    receiving at an authentication server an authentication request from a 3D print server that is associated with the 3D printer, the request comprising a unique design identifier associated with a 3D design file and a unique 3D printer identifier associated with a 3D printer, the received unique 3D design identifier being related to the received 3D printer identifier in accordance with a first relationship;
    using, at the authentication server, at least one of the received unique identifiers to access a verifying 3D design identifier and a verifying 3D printer identifier, the verifying identifiers being related to each other in accordance with a second relationship;
    comparing, at the authentication server, the first and second relationships between the received and verifying identifiers;
    generating, at the authentication server, an authentication signal if the first relationship corresponds with the second relationship;
    obtaining, using the authentication server, a decryption key associated with the received identifiers in response to the authentication signal; and
    transferring the decryption key, from the authentication server, to the 3D print server to authenticate and enable the printing of the 3D article on the 3D printer.

11. The method of claim 10, further comprising:
    providing, at the authentication server, a record indicating the number of articles that may be printed in accordance with the 3D design file;
    updating, using the authentication server, the record to indicate the number of remaining articles that may be printed in accordance with the 3D design file after the authentication response has been transferred from the authentication server.

12. The method of claim 11, wherein the method further comprises determining, using the authentication server, when the number of articles which may be printed is zero and thereafter preventing the authentication of further requests for printing of articles from that 3D design file.

13. The method of claim 10, wherein the verifying identifiers are stored in a database and the using step comprises querying the database to retrieve the second relationship.

14. The method of claim 10, further comprising logging, at the authentication server, the details of each request for authentication processed to create a transaction log of all requests; and subsequently using the transaction log to determine usage by a user of the 3D printer.

15. The method of claim 14, further comprising using the transaction log, at the authentication server, to determine the number of articles printed by each 3D printer.

* * * * *

UNITED STATES PATENT AND TRADEMARK OFFICE
CERTIFICATE OF CORRECTION

| | | |
|---|---|---|
| PATENT NO. | : 9,604,406 B2 | Page 1 of 1 |
| APPLICATION NO. | : 14/114495 | |
| DATED | : March 28, 2017 | |
| INVENTOR(S) | : Siavash Haroun Mahdavi, Anthony Ruto and Hooman Shayani | |

It is certified that error appears in the above-identified patent and that said Letters Patent is hereby corrected as shown below:

In the Claims

In Column 21, Line 55, Claim 4, change "the optical power output" to read as --an optical power output--

In Column 21, Line 58, Claim 5, change "the focal spot size" to read as --a focal spot size--

In Column 22, Line 13, Claim 8, change "the 3D print file" to read as --a 3D print file--

In Column 22, Line 27, Claim 10, change "a 3D printer" to read as --the 3D printer--

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*